(12) United States Patent
Abu Al-Rub et al.

(10) Patent No.: US 11,286,831 B2
(45) Date of Patent: Mar. 29, 2022

(54) CATALYTIC CONVERTER SUBSTRATES COMPRISING TRIPLY PERIODIC MINIMAL SURFACES

(71) Applicant: KHALIFA UNIVERSITY OF SCIENCE AND TECHNOLOGY, Abu Dhabi (AE)

(72) Inventors: Rashid Kamel Abu Al-Rub, Abu Dhabi (AE); Oraib Gheath Al-Ketan, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 414 days.

(21) Appl. No.: 16/098,314

(22) PCT Filed: May 2, 2017

(86) PCT No.: PCT/US2017/030533
§ 371 (c)(1),
(2) Date: Nov. 1, 2018

(87) PCT Pub. No.: WO2017/192508
PCT Pub. Date: Nov. 9, 2017

(65) Prior Publication Data
US 2019/0145298 A1    May 16, 2019

Related U.S. Application Data

(60) Provisional application No. 62/330,878, filed on May 3, 2016.

(51) Int. Cl.
*F01N 3/28* (2006.01)
*B01D 53/34* (2006.01)
(Continued)

(52) U.S. Cl.
CPC ........... *F01N 3/2828* (2013.01); *B01D 53/34* (2013.01); *B22F 5/10* (2013.01); *B22F 10/20* (2021.01);
(Continued)

(58) Field of Classification Search
CPC ........ F01N 3/28; F01N 3/2828; F01N 3/2821; F01N 2330/04; F01N 2370/02; B22F 3/1055; B22F 5/10; B22F 2302/00
See application file for complete search history.

(56) References Cited

U.S. PATENT DOCUMENTS 6,101,714 A * 8/2000 Schmitt ................. F01N 3/2853
29/890
6,221,463 B1    4/2001 White
(Continued)

FOREIGN PATENT DOCUMENTS

| EP | 1284159 | 2/2003 |
|----|---------|--------|
| WO | 2013088129 | 6/2013 |
| WO | 2015/140250 | 9/2015 |

OTHER PUBLICATIONS

International Search Report and Written Opinion of the International Searching Authority corresponding to International Patent Application No. PCT/US2017/030533 dated Sep. 7, 2017. (7 pages).
(Continued)

*Primary Examiner* — Youngsul Jeong
(74) *Attorney, Agent, or Firm* — Kilpatrick Townsend & Stockton LLP

(57) ABSTRACT

Described herein are catalytic converter substrates or cores based on triply periodic minimal surfaces (TPMS) geometries, along with methods of making and using the same.

10 Claims, 18 Drawing Sheets

(51) Int. Cl.
*B22F 10/10* (2021.01)
*B22F 10/20* (2021.01)
*B22F 5/10* (2006.01)
*B01D 53/94* (2006.01)

(52) U.S. Cl.
CPC ......... *F01N 3/2803* (2013.01); *F01N 3/2807* (2013.01); *F01N 3/2821* (2013.01); *F01N 3/2825* (2013.01); *B01D 53/945* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/206* (2013.01); *B01D 2255/2061* (2013.01); *B01D 2255/2065* (2013.01); *B01D 2255/20715* (2013.01); *B01D 2255/20753* (2013.01); *B01D 2255/20761* (2013.01); *B22F 2301/355* (2013.01); *B22F 2302/00* (2013.01); *B22F 2999/00* (2013.01); *F01N 3/2839* (2013.01); *F01N 2330/04* (2013.01); *F01N 2330/22* (2013.01); *F01N 2330/44* (2013.01); *F01N 2370/02* (2013.01); *Y02T 10/12* (2013.01)

(56) References Cited

U.S. PATENT DOCUMENTS

2014/0014493 A1* 1/2014 Ryan .................... B01D 61/364
  203/89
2016/0001275 A1* 1/2016 Goto .................... B01D 53/944
  423/230

OTHER PUBLICATIONS

Extended European Search Report corresponding to EP 17793106.0, dated Oct. 15, 2019 (6 pages).
EP17793106.0, Communication Pursuant to Article 94(3), dated May 29, 2020, 3 pages.
EP17793106.0, Communication under Rule 71(3) EPC, dated Nov. 3, 2020, 7 pages.
Application No. EP17793106.0, Notice of Decision to Grant, dated Mar. 18, 2021, 2 pages.

* cited by examiner

A.

B.

C.

D.

A.

B.

C.

A.

B.

//<br>
CATALYTIC CONVERTER SUBSTRATES COMPRISING TRIPLY PERIODIC MINIMAL SURFACES

RELATED APPLICATION

This application is a 35 U.S.C. 371 national stage application PCT International Application No. PCT/US2017/030533, filed on May 2, 2017, which claims the benefit of United States Provisional Patent Application Ser. No. 62/330,878, filed on May 3, 2016, the disclosure of which are incorporated by reference herein in their entireties. The above-referened PCT International Application was published in the English language as International Publication No. WO 2017/192508 A1 on Nov. 9, 2017.

FIELD OF THE INVENTION

The present invention relates to catalytic converter substrates or cores based on triply periodic minimal surfaces (TPMS) geometries, along with methods of making and using the same.

BACKGROUND

To reduce pollutants in exhaust gases, catalytic converters may be used to convert pollutants into non-pollutants. Catalytic converters may include a substrate on which catalysts may be deposited and/or coated. Substrates of catalytic converters having a high surface area and curved surfaces may be beneficial for increasing conversion efficiency.

SUMMARY OF THE INVENTION

A substrate structure for a converter may include a plurality of unit cells arranged in three dimensions. Each of the plurality of unit cells may include a cavity defined by a triply periodic minimal surface, and the cavities of the plurality of unit cells may be interconnected to allow a fluid to pass through the cavities of the plurality of unit cells.

In some embodiments, each of the plurality of unit cells may include a sheet-shaped body, and both opposing surfaces of the sheet-shaped body define triply periodic minimal, surfaces, that define cavities. The sheet-shaped body may have a uniform thickness.

According to some embodiments, each of the plurality of unit cells may include a solid body, and only one surface of opposing surfaces of the solid body may define a triply periodic minimal surface that defines a cavity.

In some embodiments, the triply periodic minimal surface may be a Schwarz Primitive surface, a Schwarz crossed layers of parallels (CLP), a Schoen's Gyroid surface, a Schoen's I-WP surface, a Schwarz diamond surface, a Fischer-Koch PMY surface, a FRD surface, a Fischer-Koch CY surface, a Fischer-Koch S surface, or a Neovius surface.

In some embodiments, the substrate structure may include a metallic material and/or a ceramic material.

According to some embodiments, the substrate structure may further include a catalyst disposed on the triply periodic minimal surface.

According to some embodiments, the substrate structure may further include a washcoat, wherein the catalyst is dispersed in the washcoat or impregnated into the washcoat. The washcoat may have a rough and/or irregular surface.

In some embodiments, the catalyst may include platinum, palladium, rhodium, iridium, ruthenium, yttrium, zirconium, tantalum, cerium, osmium, nickel, and/or copper, and an oxide, a mixture, or an alloy thereof.

A converter may include an inlet, an outlet, a substrate structure disposed between the inlet and the outlet, and a housing enclosing the substrate. The substrate structure may include a plurality of unit cells arranged in three dimensions. Each of the plurality of unit ceils may include a cavity defined by a triply periodic minimal surface. The cavities of the plurality of unit cells may be interconnected to allow a fluid coming into the converter through the inlet to pass through the cavities of the plurality of unit cells before exhausting through the outlet.

According to some embodiments, each of the plurality of unit cells may include a sheet-shaped body, and both opposing surfaces of the sheet-shaped body define triply periodic minimal surfaces that define cavities. The sheet-shaped body may have a uniform thickness.

In some embodiments, each of the plurality of unit cells may include a solid body, and only one surface of opposing surfaces of the solid body may define a triply periodic minimal surface that defines a cavity.

In some embodiments, the triply periodic minimal surface may be a Schwarz Primitive surface, a Schwarz crossed layers of parallels (CLP), a Schoen's Gyroid surface, a Schoen's I-WP surface, a Schwarz diamond surface, a Fischer-Koch PMY surface, a FRD surface, a Fischer-Koch CY surface, a Fischer-Koch S surface, or a Neovius surface.

BRIEF DESCRIPTION OF THE INVENTION

FIG. 1 shows a catalytic converter according to some embodiments of the present invention.

FIG. 2 shows examples of triply periodic minimal surfaces: A. Schwarz Primitive surface; B. Schoen's Gyroid surface; C. Schoen's I-WP surface; D. Schwarz diamond surface; E. Fischer-Koch PMY surface; F. FRD surface; G. Fischer-Koch CY surface; and H. Fischer-Koch S surface.

Figure 6:
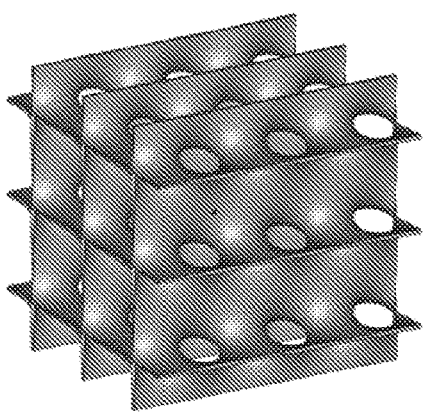
Figure 6:
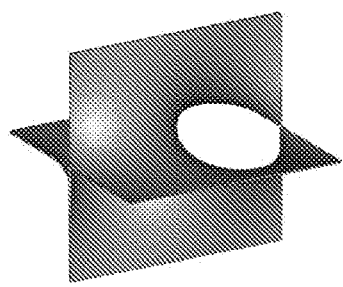
Figure 6:
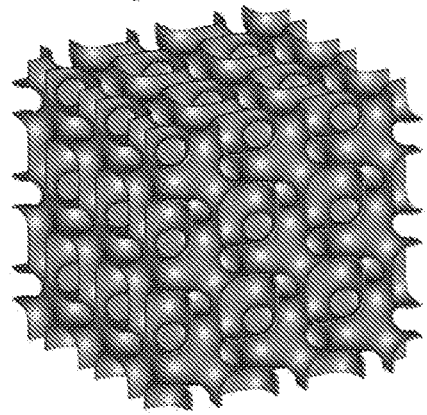
Figure 6:
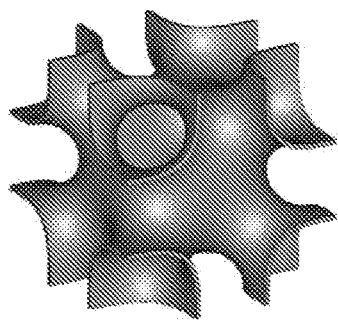
Figure 6:
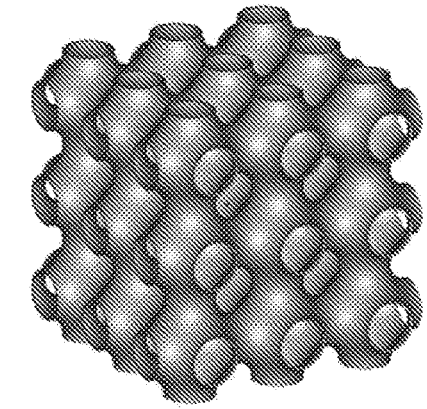
Figure 6:
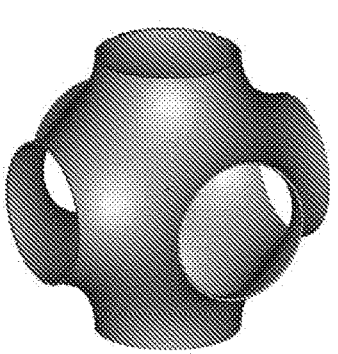
Figure 6:
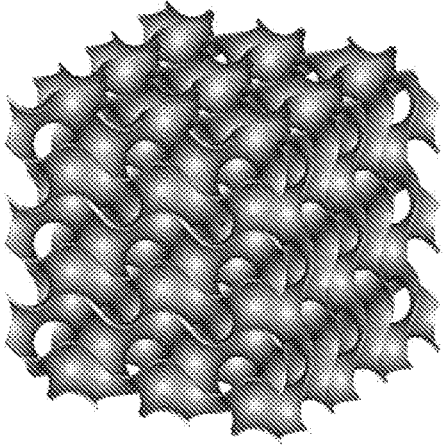
Figure 6:
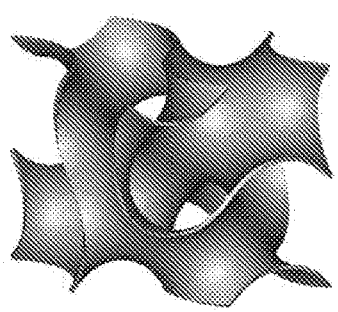

FIG. 6 shows unit cells including TPMS and substrates of a 3×3×3 pattern formed using the sheet networks strategy: A. Schwarz crossed layers of parallels surface; B. Schoen's I-WP surface; C. Schwarz Primitive surface; and D. Schoen's Gyroid surface.

Figure 7:
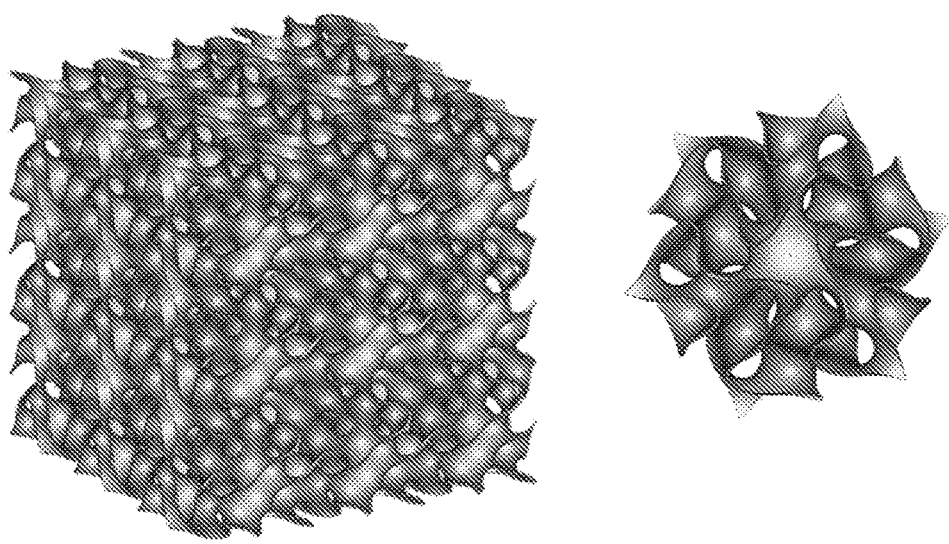
Figure 7:
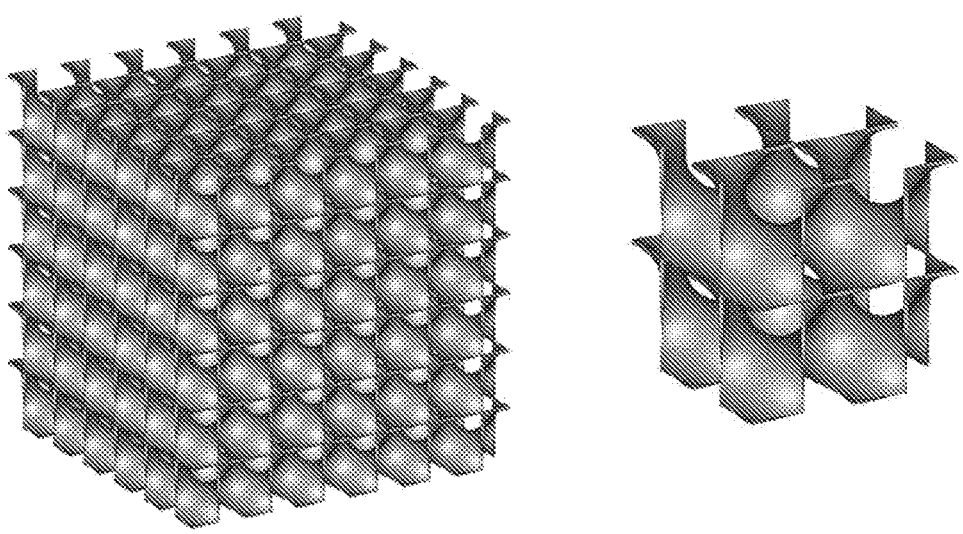
Figure 7:
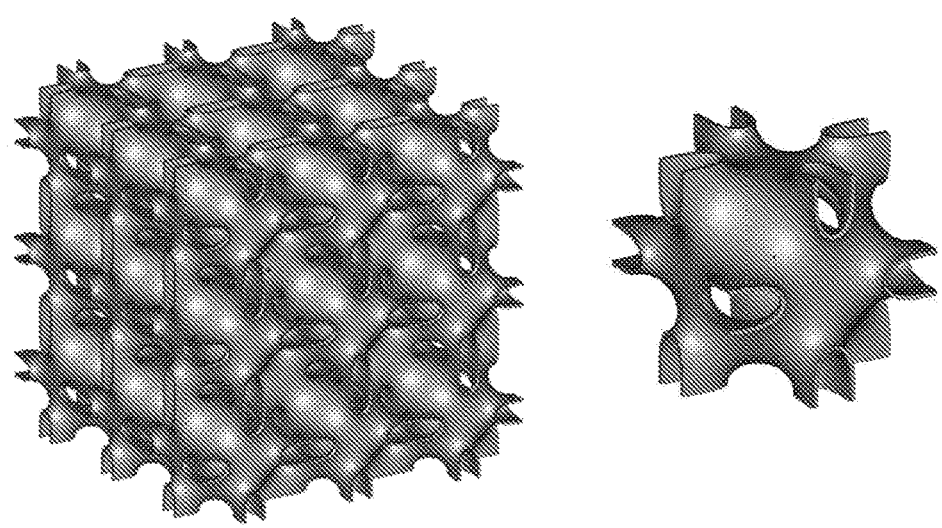

FIG. 7 shows, unit cells including TPMS and substrates of a 3×3×3 pattern formed using the sheet networks strategy: A. Fischer-Koch S surface; B. Schwarz diamond surface; and C. Neovius surface.

Figure 8:
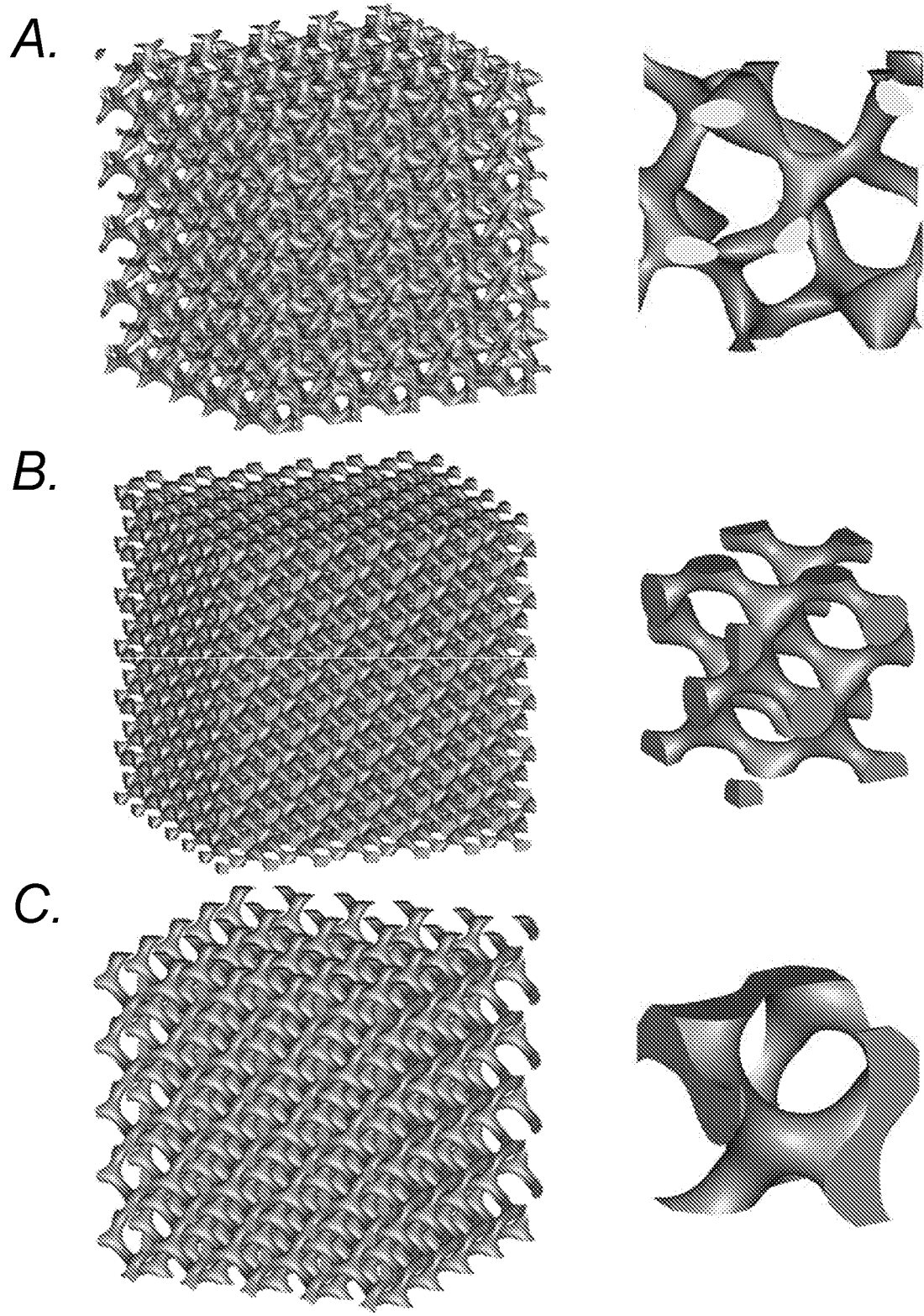

FIG. 8 shows unit cells including TPMS and substrates of a 6×6×6 pattern formed using the solid networks strategy: A. Fischer-Koch S surface; B. Schwarz diamond surface; and C. Schoen's Gyroid surface.

Figure 9:
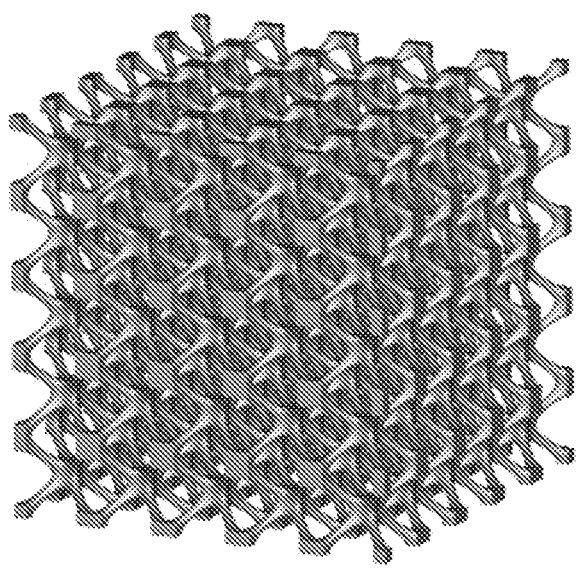
Figure 9:
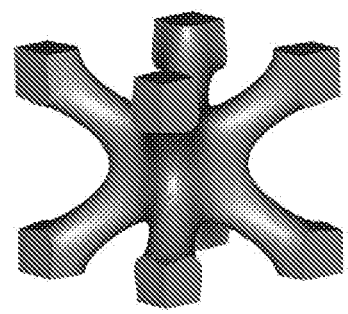
Figure 9:
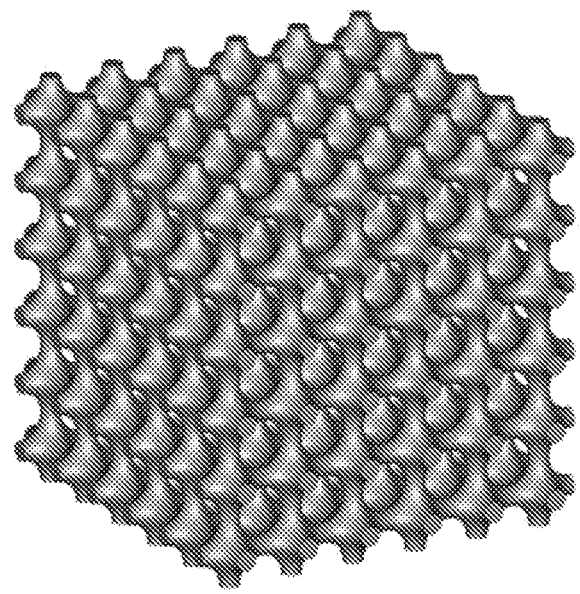
Figure 9:
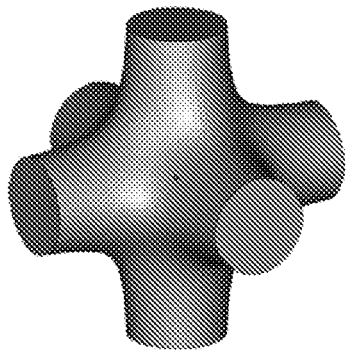

FIG. 9 shows unit cells including TPMS and substrates of a 6×6×6 pattern formed using the solid networks strategy; A. Schoen's I-WP surface; and B. Schwarz Primitive surface.

Figure 10:
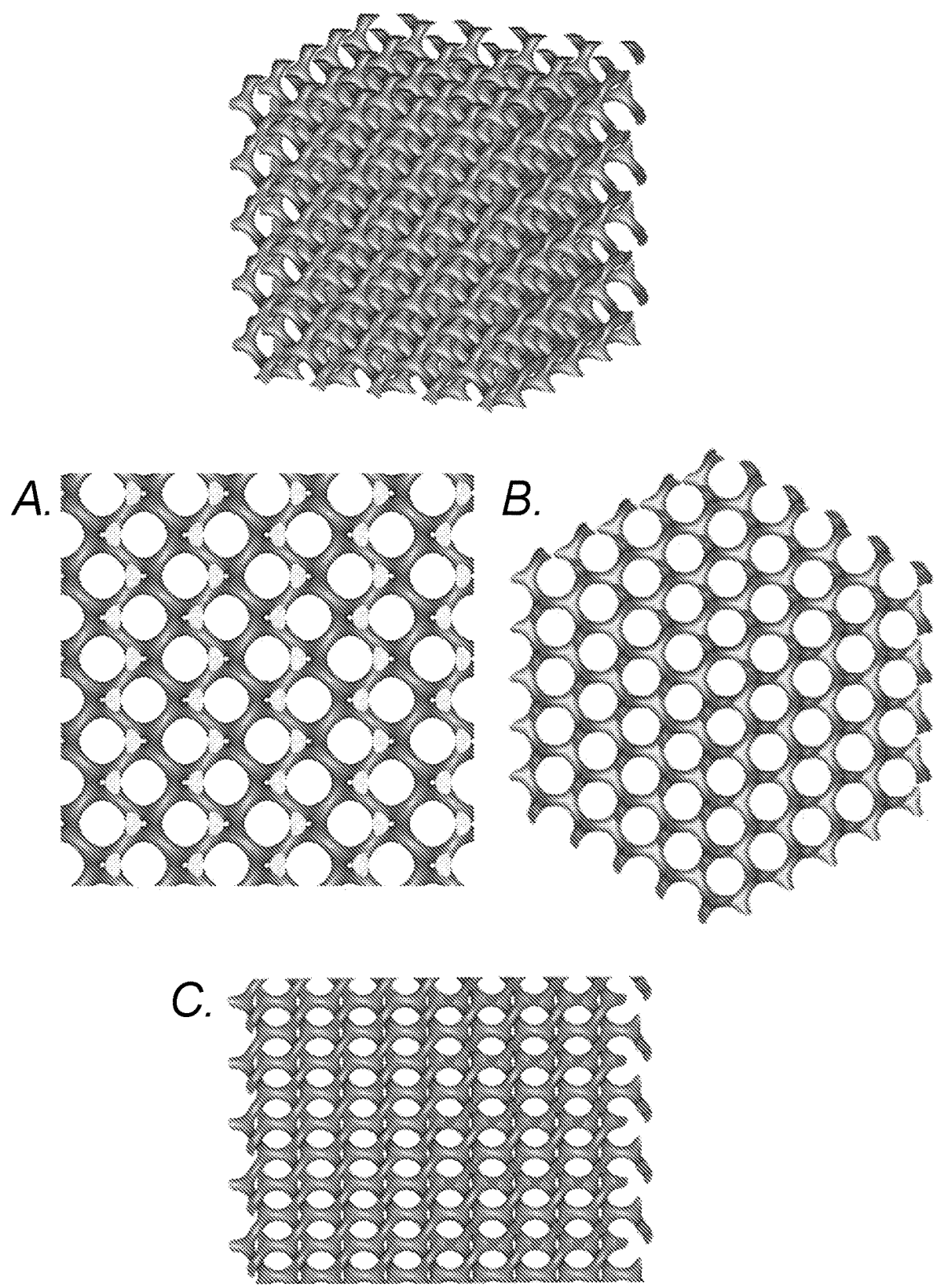

FIG. 10 illustrates 6×6×6 solid networks based Gyroid substrates in 3 possible directions for a high open frontal area: A. [100] vector direction; B. [111] vector direction; and C. [110] vector direction.

Figure 11:
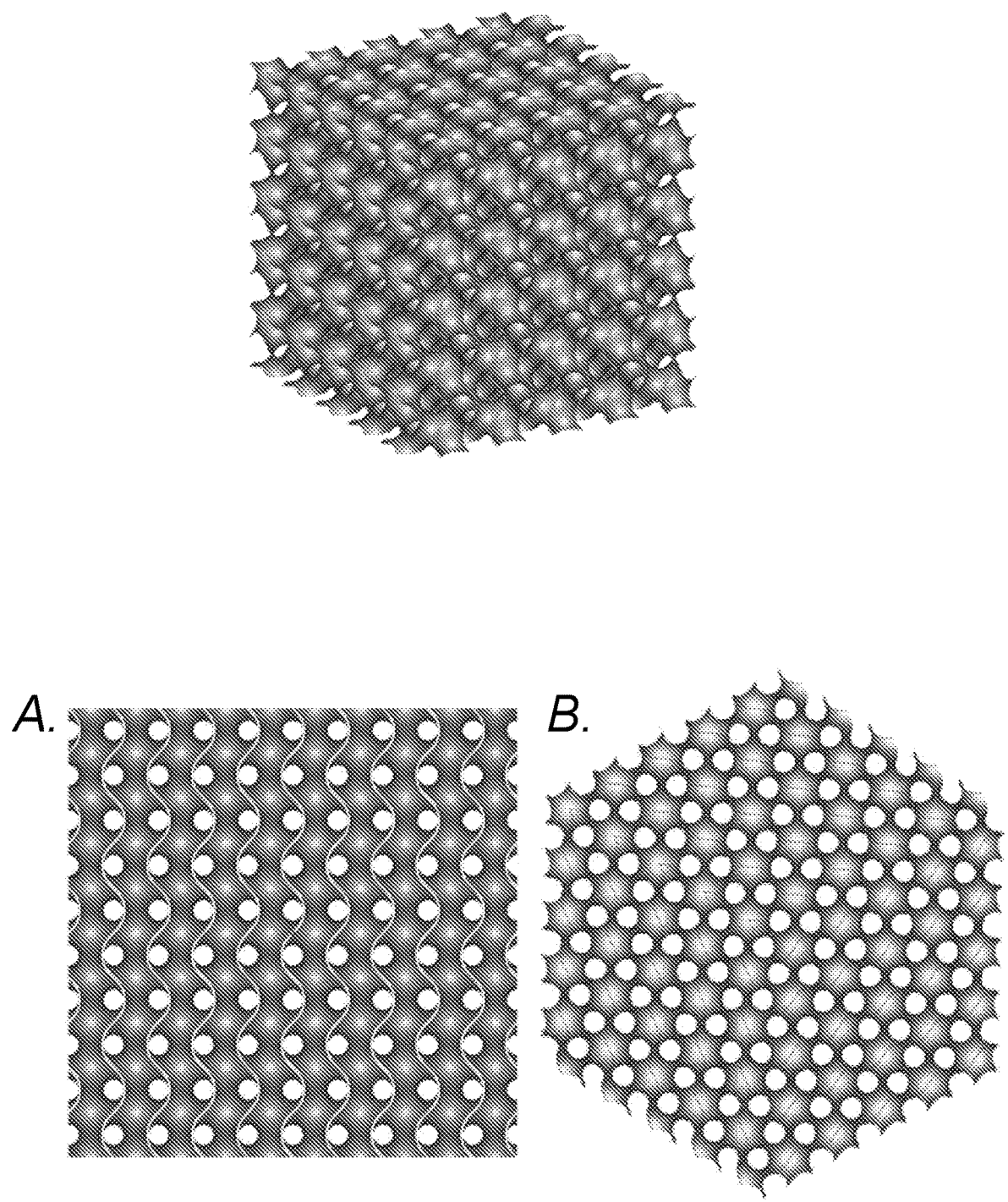

FIG. 11 illustrates 6×6×6 sheet networks based Gyroid substrates in 2 possible directions for a high open frontal area: A. [100] vector direction; and B. [111] vector direction.

Figure 12:
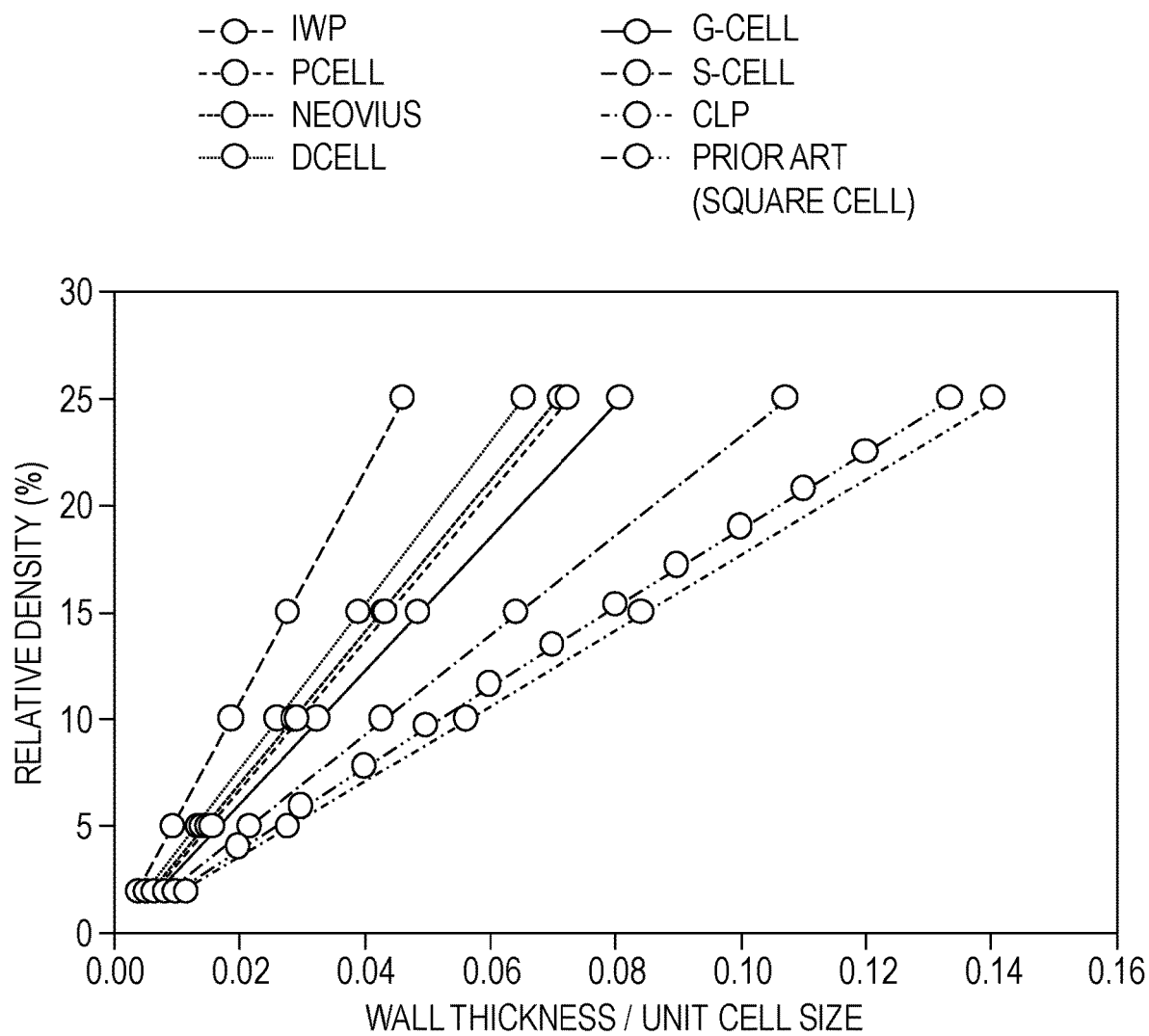

FIG. 12 plots relative density as a function of a ratio of wall thickness to unit cell size of sheet networks based substrates.

Figure 13:
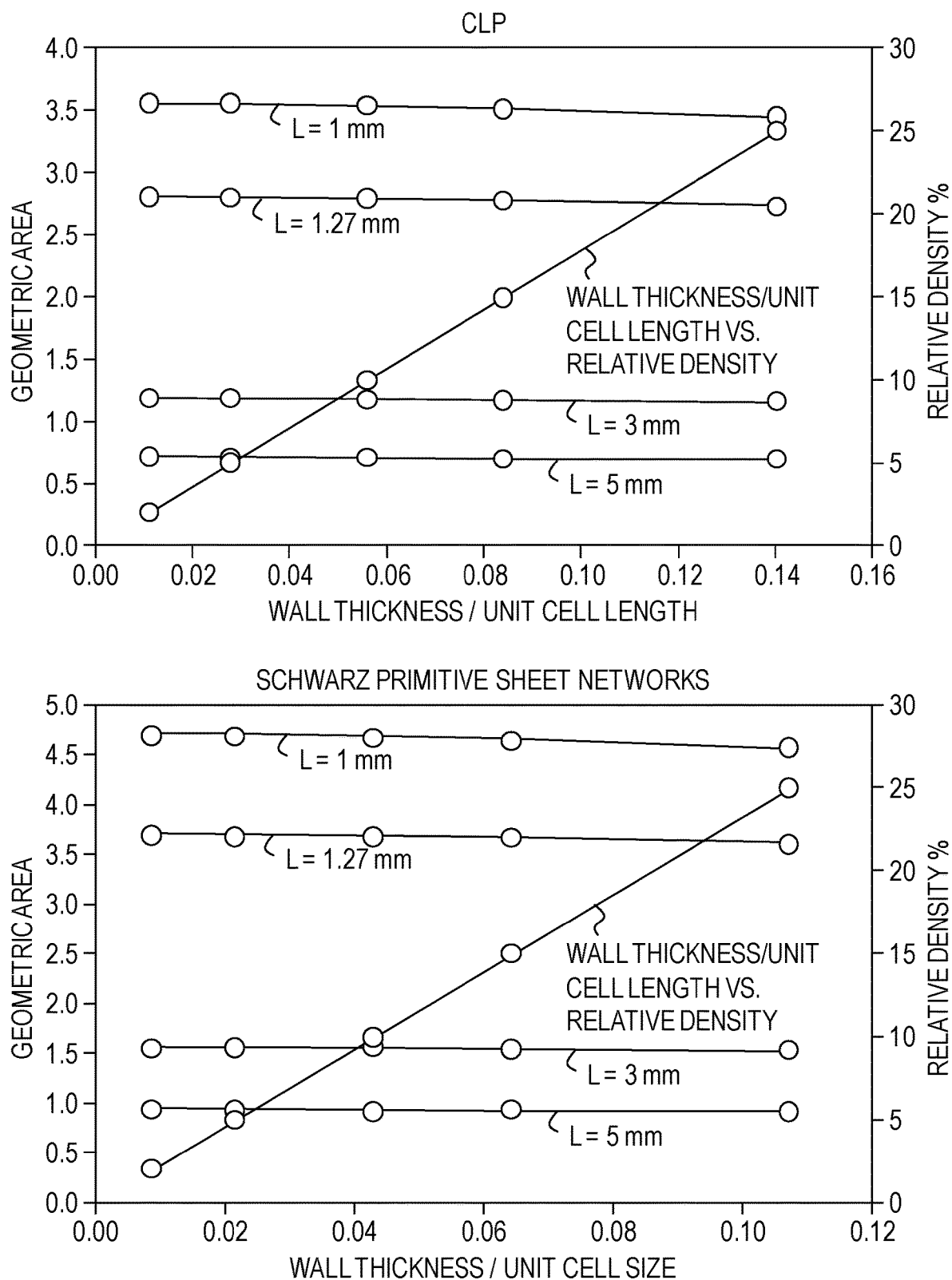

FIG. 13 plots geometric surface area as a function of a ratio of wall thickness to unit cell size—Schwarz crossed layers of parallels (CLP) and Schwarz Primitive sheet networks.

Figure 14:
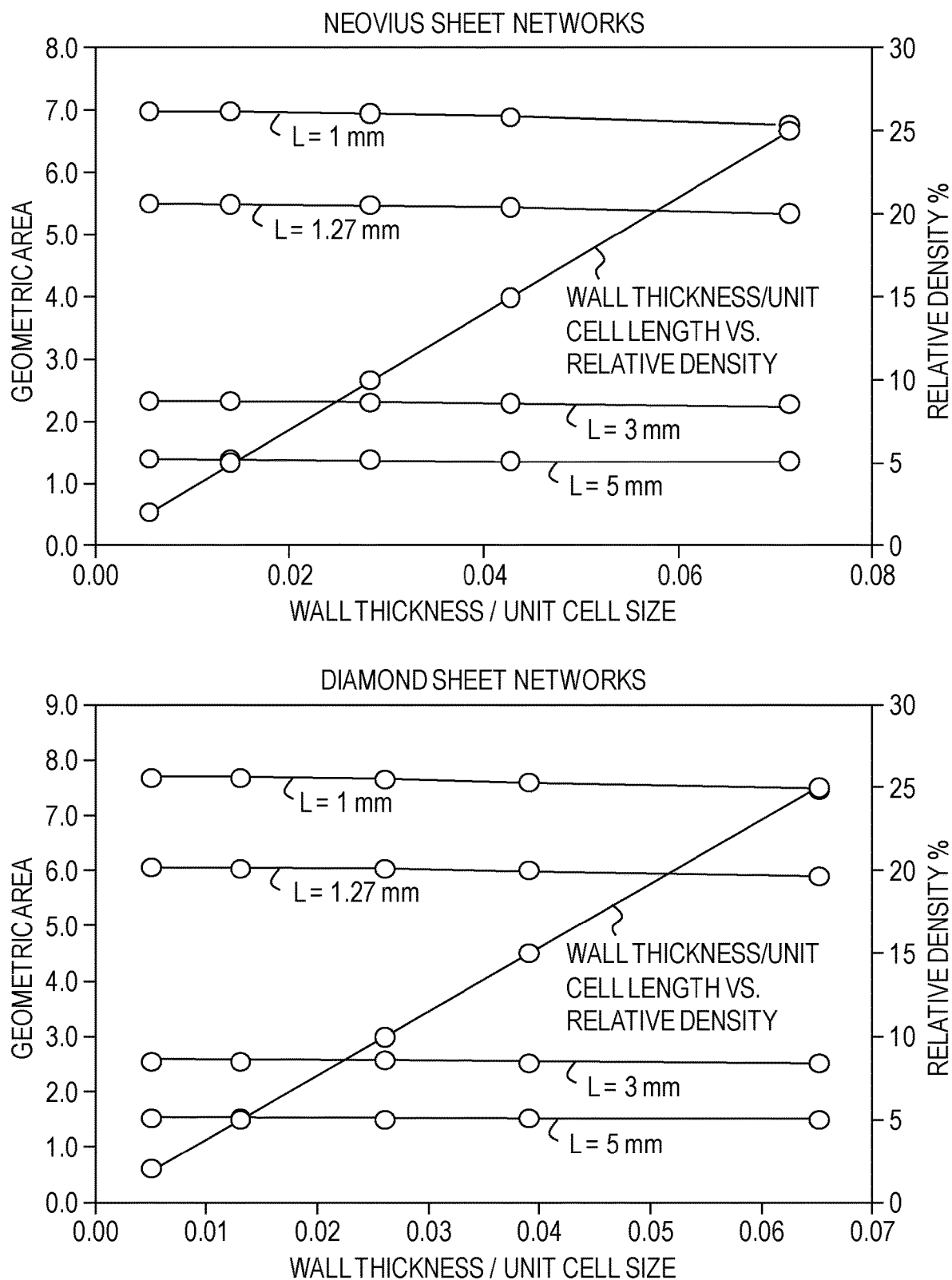

FIG. 14 plots geometric surface area as a function of a ratio of wall thickness to unit cell size—Neovius sheet networks and Diamond sheet networks.

Figure 15:
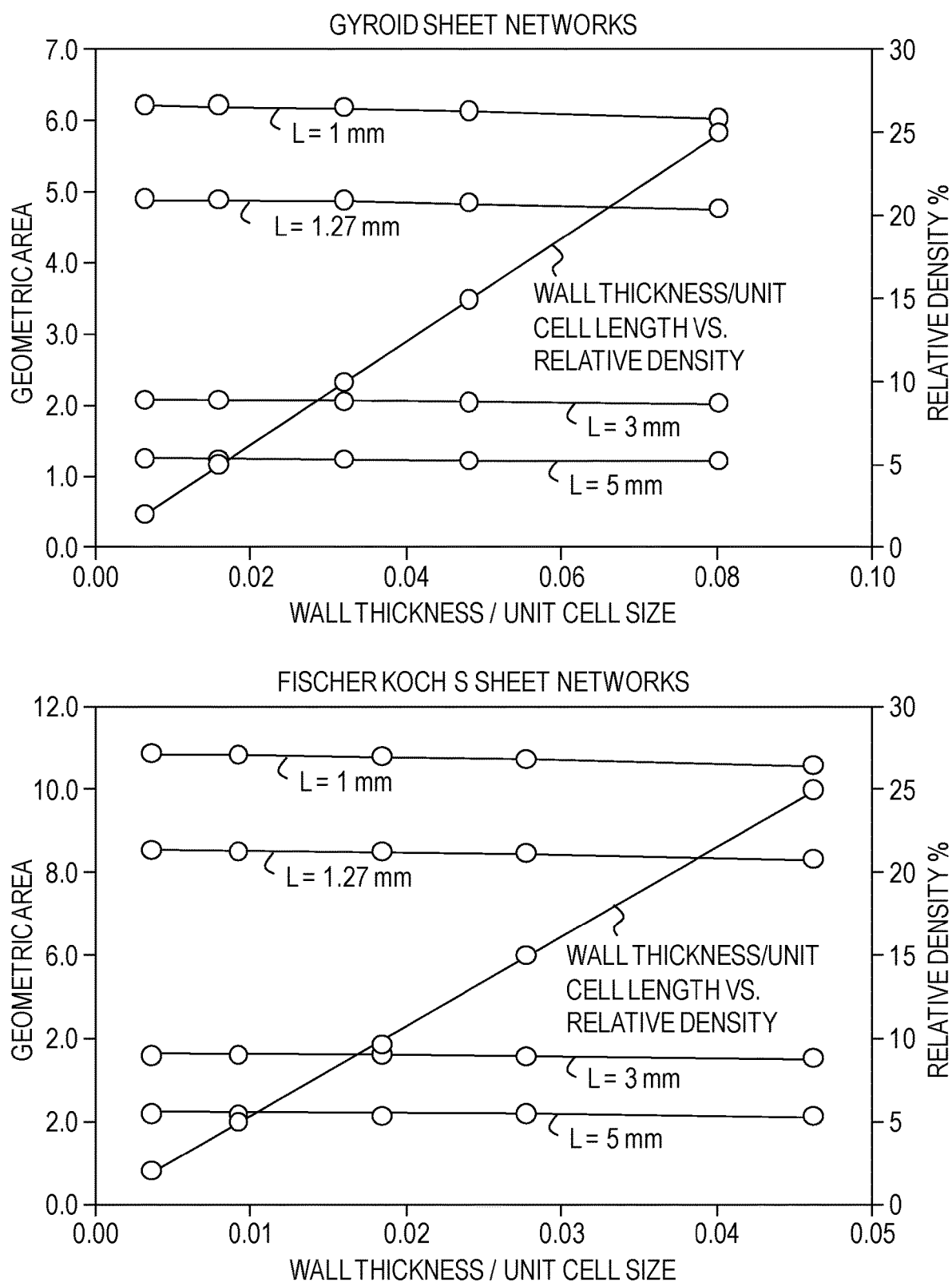

FIG. 15 plots geometric surface area as a function of a ratio of wall thickness to unit cell size—Gyroid sheet networks and Fischer Koch S sheet networks.

Figure 16:
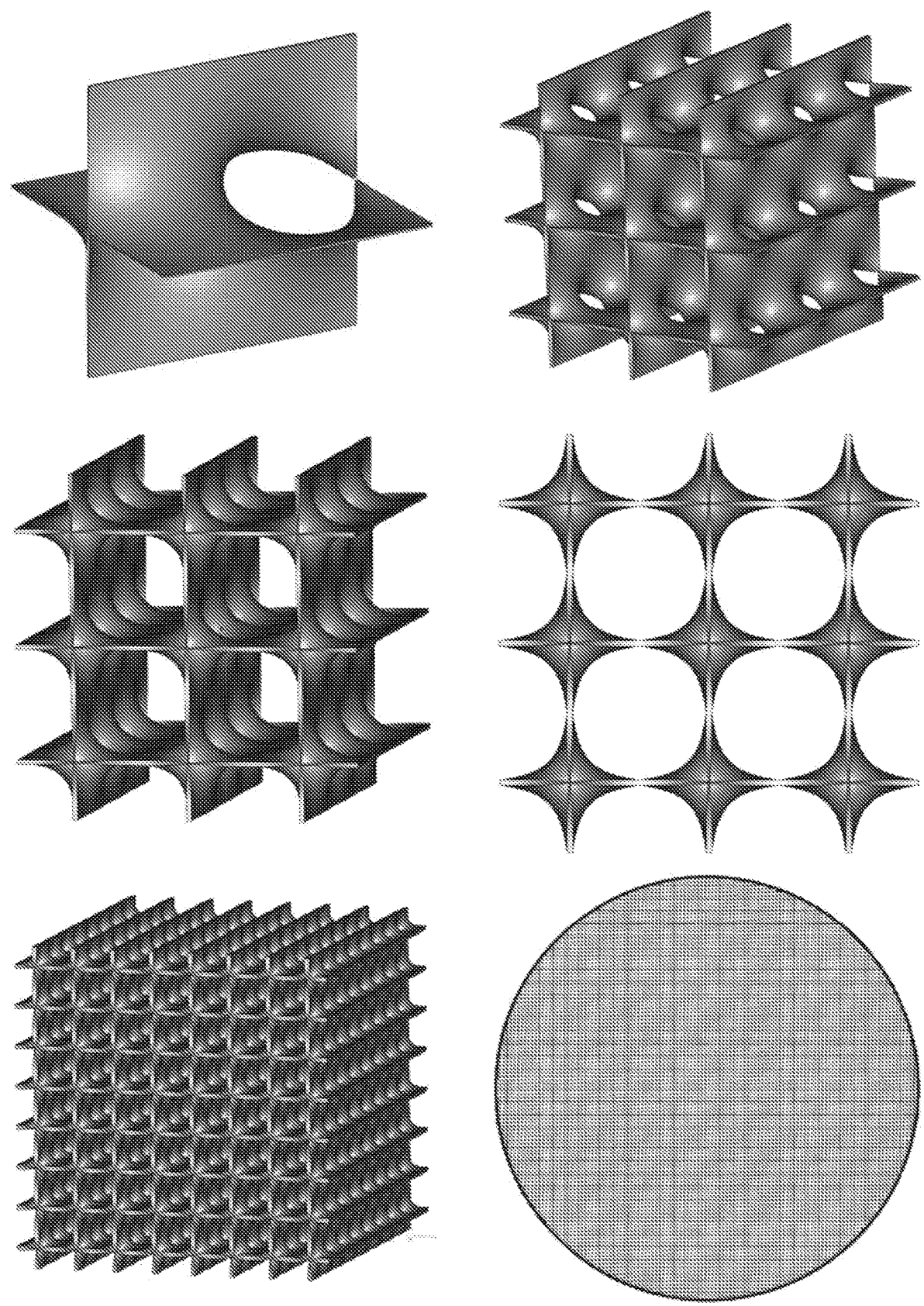

FIG. 16 illustrates a catalytic converter based on the Schwarz crossed layers of parallels (CLP) unit cell (top left), a 3×3×3 pattern of flow channels (top right), interconnected flow channels (mid-left), a frontal view the interconnected flow channels (mid-right), a 7×7 pattern of flow channels (bottom left) and a complete substrate with circular cross section (bottom right).

Figure 17:
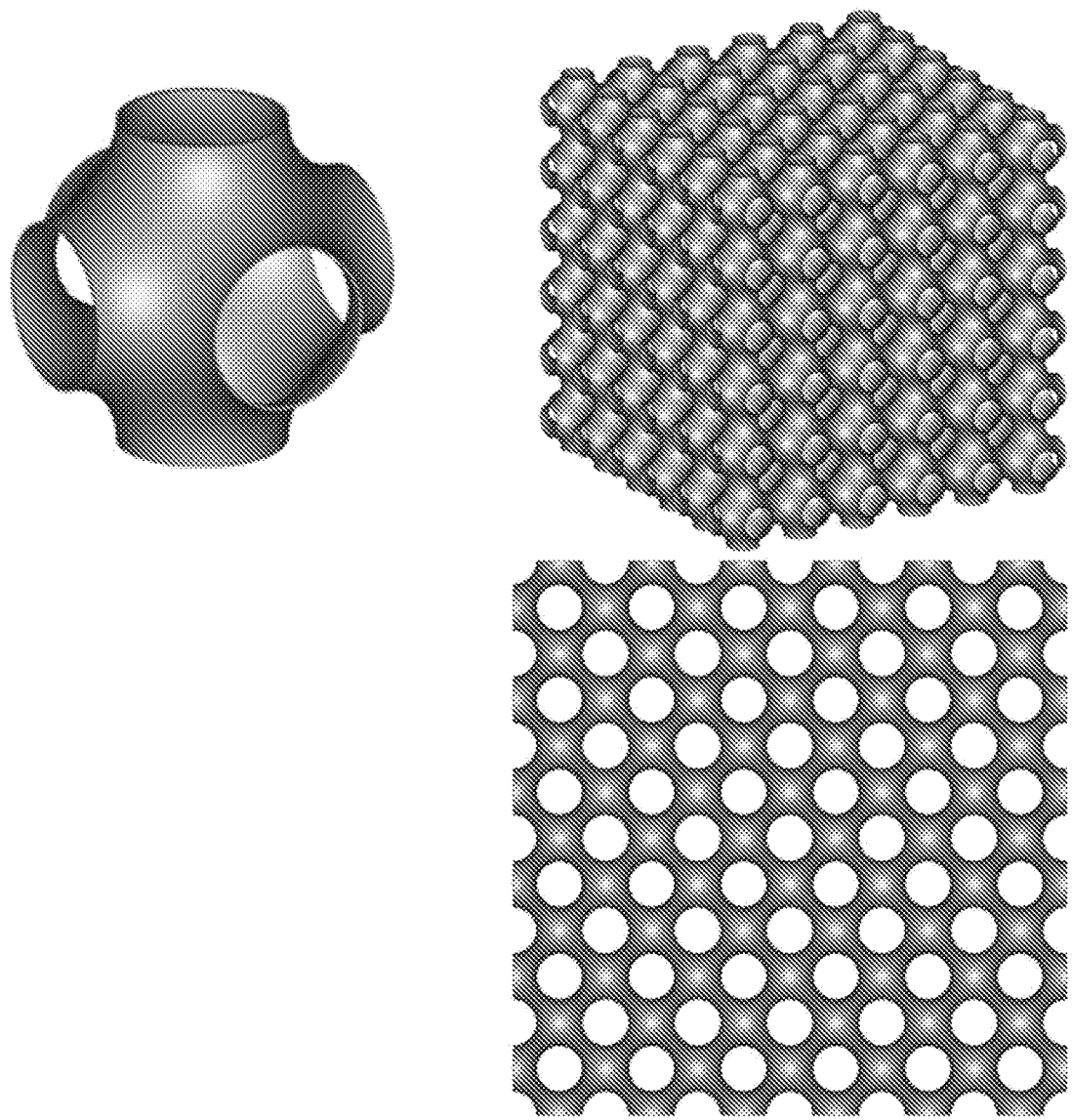

FIG. 17 illustrates a catalytic converter based on the Schwarz Primitive unit cell (top left), a part of a substrate with 6×6 unit cells interconnected (top right) and a frontal view (bottom).

Figure 18:
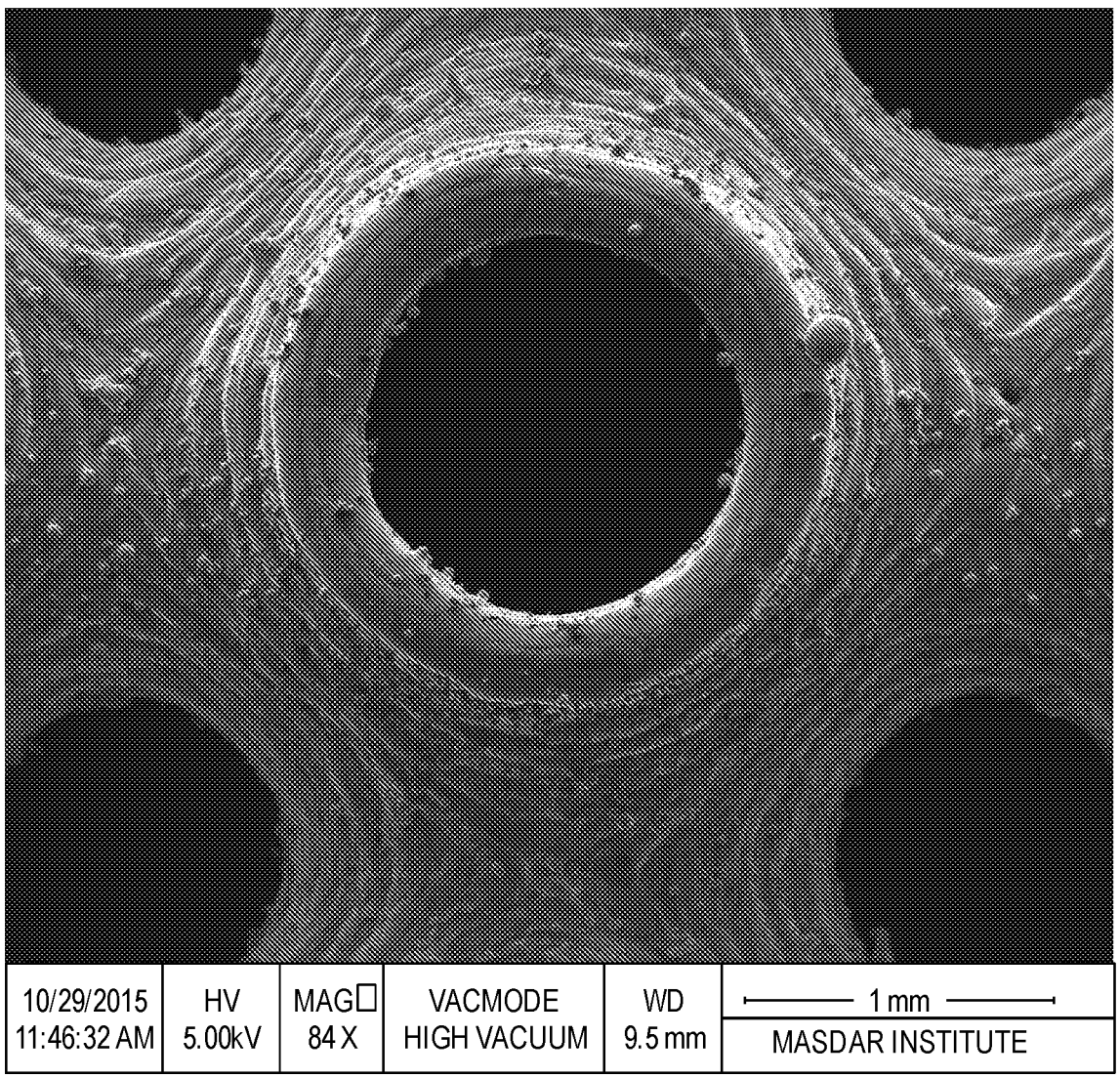

FIG. 18 shows a SEM image of a substrate made of maraging steel using a selective laser sintering technique and based on the Primitive unit cell.

DETAILED DESCRIPTION OF ILLUSTRATIVE EMBODIMENTS

The present invention is now described hereinafter with reference to the accompanying drawings, in which embodiments of the invention are shown. This invention may, however, be embodied in many different forms and should not be construed as limited to the embodiments set forth herein: rather these embodiments are provided so that this disclosure will be thorough and complete and will fully convey the scope of the invention to those skilled in the art.

The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that, any of A, B or C, or a combination thereof, can be omitted and disclaimed.

"Catalytic converter" refers to an emission regulating device that may convert pollutants (e.g., toxic pollutant) in exhaust gas produced by, for example, an internal combustion engines, into relatively less harmful substances by a conversion reaction. The catalytic converter may include a substrate enclosed by a housing material, a washcoat, and/or catalyzing materials.

"Washcoat" refers to a carrier for catalytic materials and may be used to disperse the catalytic materials over a larger surface area of a substrate of a catalytic converter. Examples of catalytic materials include, but are not limited to, titanium dioxide, aluminum oxide, silicon dioxide, or a combination of silica and alumina. A washcoat may include binders for waste components. Catalytic materials may be suspended in a washcoat before application to a substrate or a core. Washcoat materials may have rough, irregular surface to increase a surface area, which may be helpful to increase or possibly maximize a catalytically active surface area that reacts with an engine exhaust gas.

"Catalytic materials" refers to materials used in a catalytic converter to perform a converting process. Often these are "precious materials" that are rare and have high economic value. For example, catalytic precious materials may be metals including platinum, palladium and/or rhodium. Platinum may be used as a reduction catalyst or as an oxidation catalyst. Although platinum is a very active catalyst and widely used, it is very expensive and may not be suitable for all applications. Rhodium may be used as a reduction catalyst, and palladium may be used as an oxidation catalyst. These rare metals currently account for up to 60-70% of a cost of the catalytic converter component.

"Substrate or Core" refers to a structure that holds a washcoat and precious materials (e.g., impregnated precious materials.) The substrate structure may provide flow passages for exhaust gases. Exhaust gases may pass through a substrate structure and may react with a conversion material thereby being purified.

"Warm-up time" refers to a time required for a substrate to reach a temperature at which the catalytic reaction is efficient.

"Minimal surface" refers to a surface that locally minimizes its area such that the mean curvature at each point on the surface is zero.

"Mean curvature" refers to an average of the two principal curvatures.

"Principal curvatures" refers to the maximum and minimum of the normal curvatures at a specific point.

"Triply periodic minimal surface" (TPMS) refers to a minimal surface having a unit cell that can be repeated in three directions and has no self-intersections such that it divides the spaces into two interpenetrating meandering spaces.

"3D printing" refers to a method of forming a three-dimensional object using, for example, an additive manufacturing technology. A portion of a three-dimensional object may be created by forming/printing successive layers of materials.

"Additive manufacturing" refers to a process of joining a layer to underlying layer(s) to form a three-dimensional object.

"Selective laser sintering" refers to a process used for 3D printing. A selective laser sintering process may use a laser beam to melt a layer of fine powders, and the melted fine powders may be solidified to have a desired shape. After then, another layer of fine powders may be placed on the underlying layer and the same or similar process is performed. These unit processes may be repetitively performed until a final structure is formed.

"Computer aided design" (CAD) refers to the use of computer software to help designers create and achieve their required design.

"Computer aided manufacturing" (CAM) refers to the control of a manufacturing process via computer software. Parts may be designed using computer aided design (CAD) technologies. The control takes the form of controlling manufacturing tools, manufacturing time, and ultimately manufacturing accuracy.

According to some embodiments, a converter substrate or core may be made using triply periodic minimal surfaces (TPMS) to effectively reduce a waste component while enhancing its mechanical and functional properties.

In some embodiments, a converter (e.g., gaseous waste converter) may include an inlet, an outlet, a housing and a catalyst, a binder or other waste converting substrate including an internal structure based on TPMS. A gaseous waste converter is a converter that may degrade, bind or perform other reactions to reduce or possibly remove undesired waste components from gases or air while those are passing through the gaseous waste converter. In some embodiments, a TPMS-based structure may include a smooth, curved, continuous, interconnected geometry structure, and a high specific surface area of the TPMS-based structure may allow more uniform deposition of a catalyst, a binder or other waste converting materials such as a washcoat and precious metals in the washcoat. Structures including sharp edges and corners that may tap a large amount of a washcoat and thus may cause inefficient use of precious metals. In some embodiments, by using the TPMS structure, an amount of a catalyst, a binder or other waste converting materials, including but not limited to, precious metals, used In a converter may be reduced.

Figure 2:
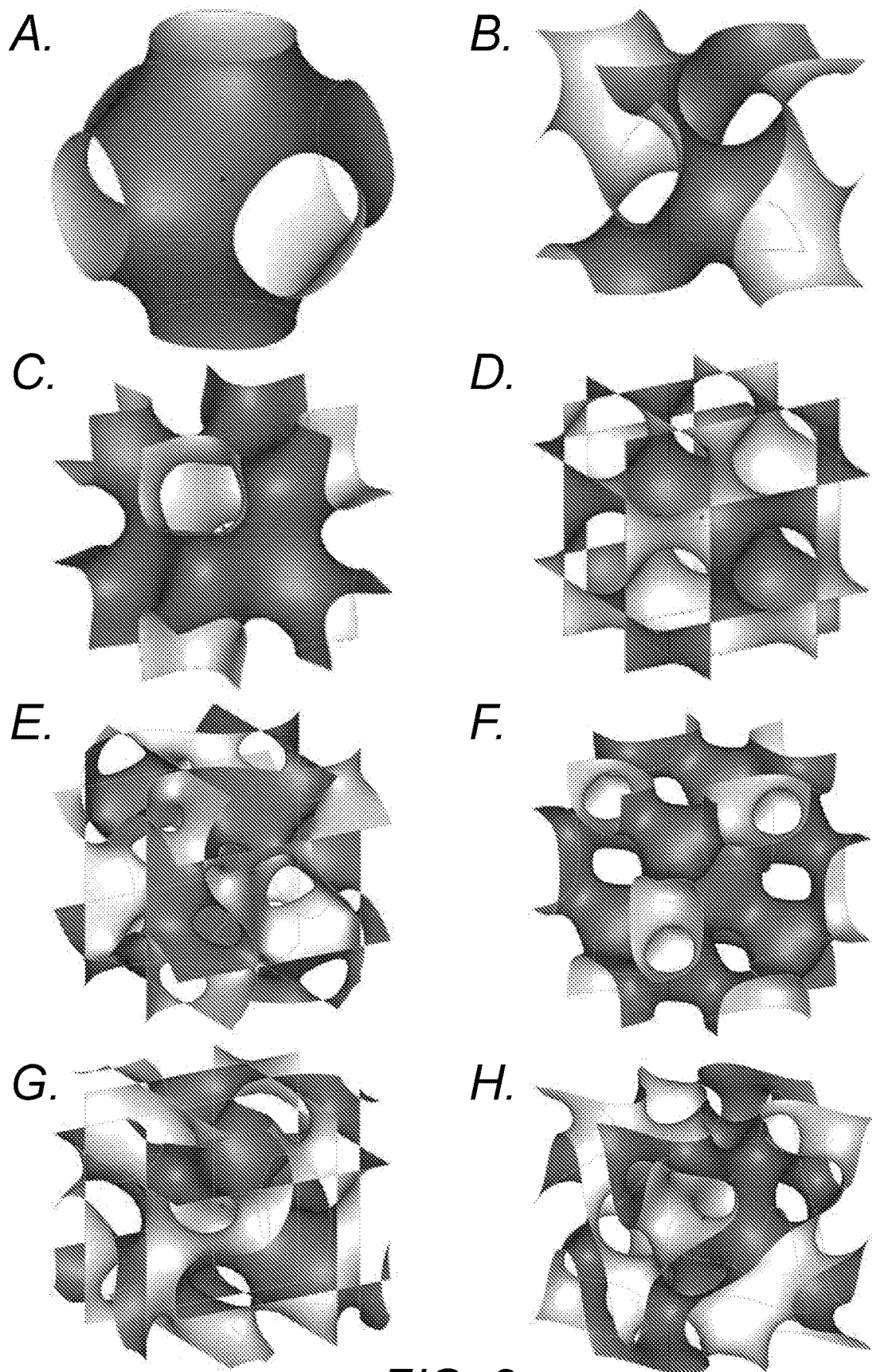

In some embodiments, as shown in FIG. 2, triply periodic minimal surfaces with no enfolded volumes may be employed to create a substrate structure using two strategies. The first strategy (sheet-networks) is giving a minimal surface a certain thickness, which is continuous and fixed throughout the surface, such that a new volume is created by offsetting the triply periodic minimal surface in two directions. In this strategy, a shell-like structure may be created, and two separated void volumes that provide flow passages of exhaust gases may be formed. According to the second strategy (solid-networks), a first one of volumes separated by a minimal surface is solidified, and a second one of the volumes separated by the minimal surface is void. In some embodiments, the first one of the volumes separated by the minimal surface is completely solid, and the second one of the volumes separated by the minimal surface is completely void to provide a flow passage of exhaust gases (e.g., harmful gases).

In some embodiments, a TPMS-based structure (e.g., a substrate structure) may induce turbulence in gases or air flowing through the TPMS structure due to its labyrinth shape. The turbulence of the gases or air flowing through the TPMS structure may enhance catalytic conversion and heating of the TPMS structure.

In some embodiments, a TPMS-based structure may provide higher mechanical integrity through the geometry and architecture of the TPMS-based structure in addition to the strength of the properties of the base materials used. In some embodiments, the TPMS-based structure may be more resistant to shock hearting, thermal stresses, and/or cracking.

In some embodiments, higher strength, damage-tolerance, and structural stability of a TMPS-based structure may allow the use of thinner walls or struts of a substrate material. Accordingly, a weight and an amount of material of a substrate may be reduced while a surface area increases. Thinning of the walls or struts may be limited to provide tolerance to mechanical vibrations and shocks. Using a TPMS-based substrate may enable reducing the thickness of walls or struts of a substrate and thus may reduce the weight and increase the total number of flow passages available for exhaust gases. An increase of an available surface area over which exhaust gases flow may result in an increased conversion efficiency. For catalyst applications, a reduction in wall and strut thicknesses also may lead to a reduced heat capacity of the overall structure, and the double effect of the induced turbulence and the reduced heat capacity may enhance the speed of temperature elevation of the substrate, which may reduce the warm-up time and may enable achieving higher conversion efficiency.

In some embodiments, a catalytic substrate including a TPMS-based structure may include a substrate material including an inlet, an outlet, interconnected and continuous openings therebetween to provide exhaust gas passages through the substrate, and may further include a catalyst material.

In some embodiments, smooth and continuous surfaces of a TPMS-based structure may result in smooth transition of gas flow and a low pressure drop.

In some embodiments, as shown in FIG. 10 and FIG. 11, an orientation, of substrates including TPMS surfaces may be determined to increase or possibly maximize frontal open area such that, if exhaust gases flow parallel to that orientation, a low pressure drop (in some embodiments, minimal pressure drop), across the inlet and outlet of the substrate may be produced.

In some embodiments, inter-penetrating maze-like flow passages created by the minimal surface walls or struts may allow gases that flow through one unit cell to another to split into multiple paths and may result in increased turbulence. This turbulence may reduce or possibly remove a boundary layer between gases (e.g., particle in gases) and surfaces that carries catalysts and may result in increased contact between the gases and the catalysts, thereby increasing conversion efficiency. This turbulence may also enhance heat transfer between exhaust gases and the walls and may result in reducing warm-up time.

In some embodiments, turbulence created by inter-penetrating maze-like flow passages may enhance heat transfer between exhaust gases and the walls and may result in reducing a warm-up time.

In some embodiments, TPMS-based substrates may increase or possibly optimize both fluid flow permeability and thermal conductivity. According to some embodiments, warm-up time may be decreased for more efficient treatment of harmful exhaust gases and back-pressure (or pressure-drop) may be decreased for more efficient engine performance.

Figure 3:
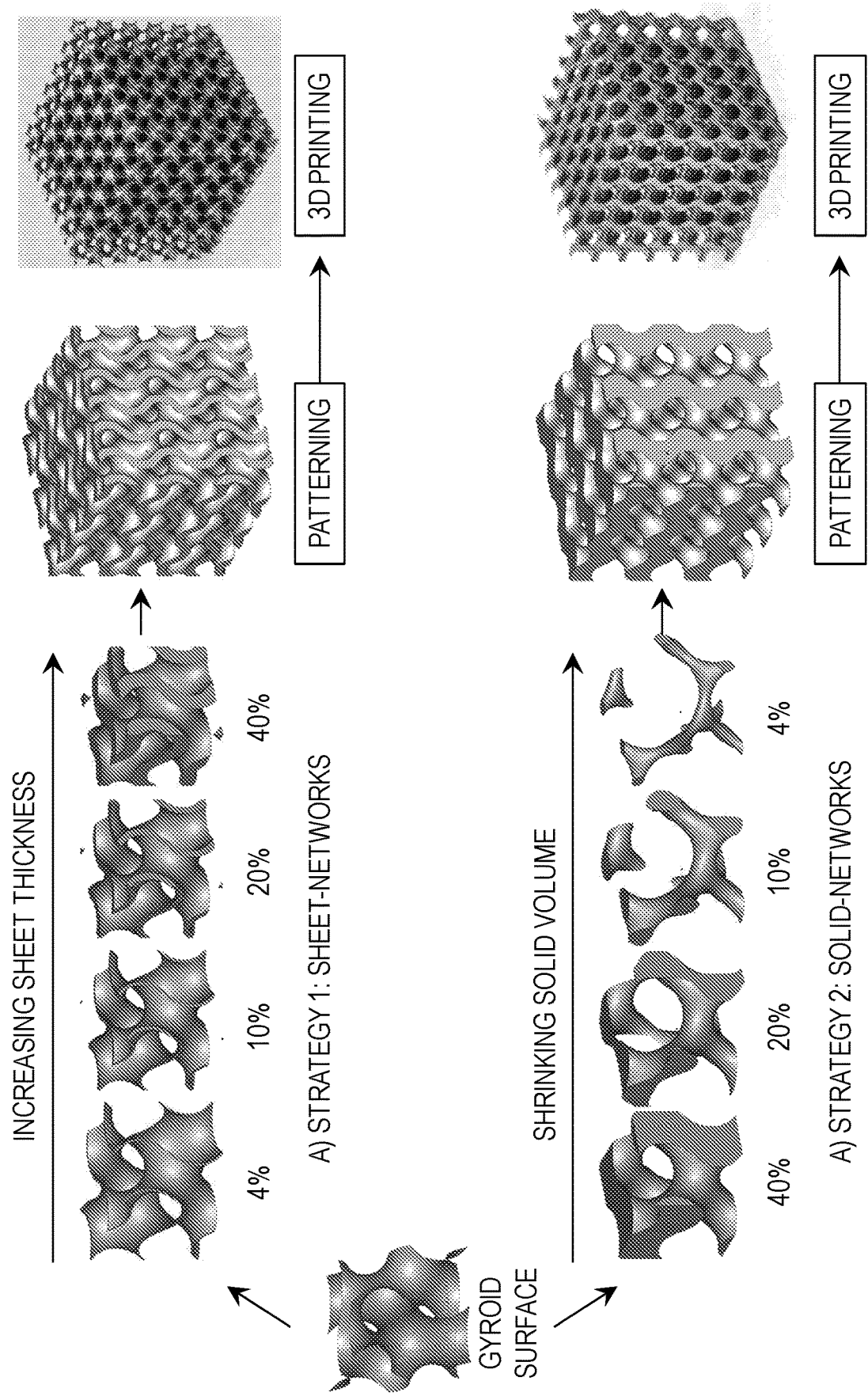
FIG. 3 illustrates strategies of employing triply periodic minimal surfaces to create a substrate for catalytic converter according to some embodiments of the present invention.
Figure 4:
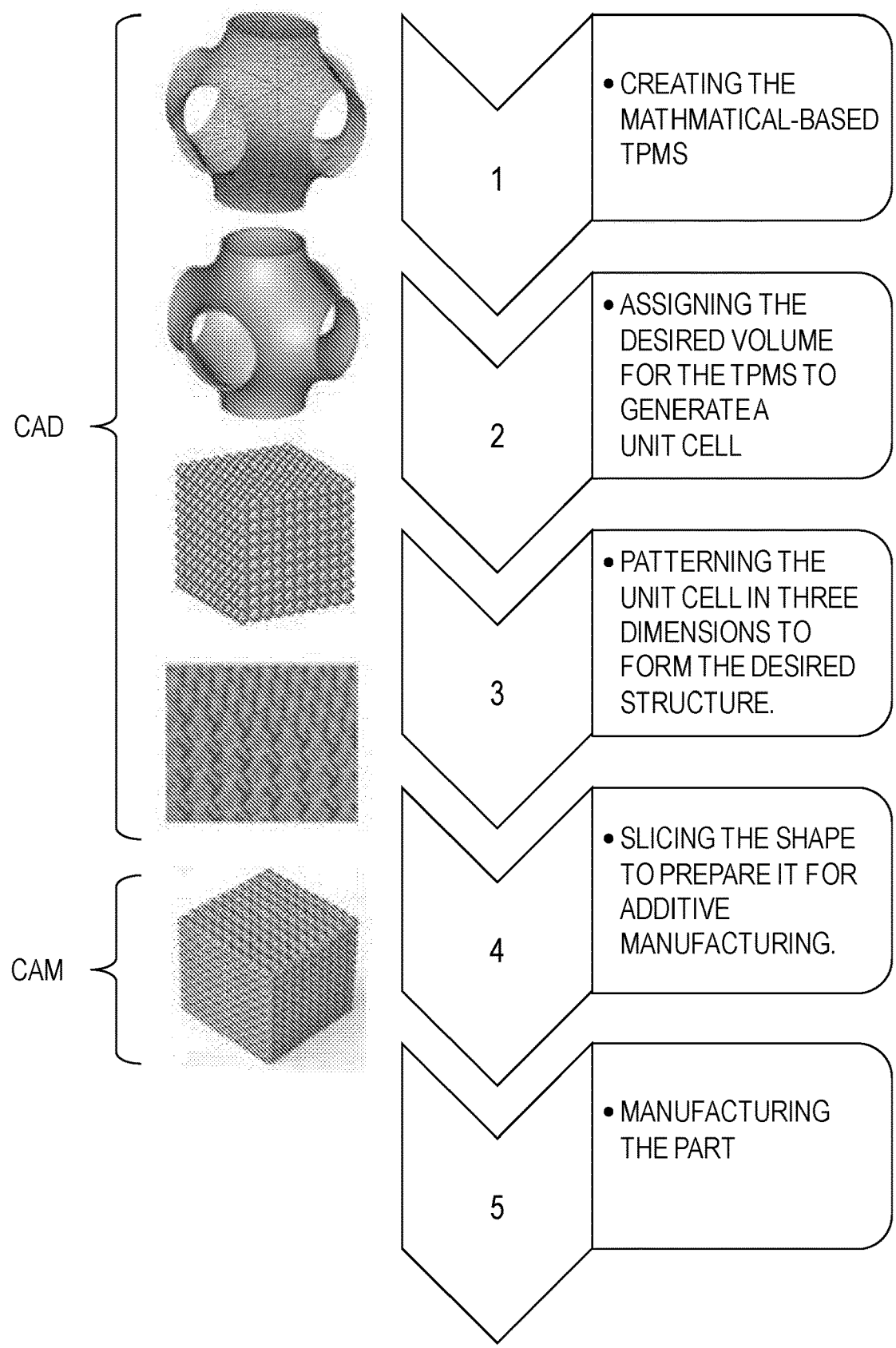
FIG. 4 illustrates a method of designing and fabricating a catalytic converter substrate based on triply periodic minimal surfaces.

In some embodiments, as shown in FIGS. 3 and 4, a first step of a method of manufacturing a TPMS-based substrate for a catalytic converter may use a computer-aided design (CAD) software to create mathematically based digital, files for a desired three-dimensional triply periodic minimal surface. In a second step, the minimal surface may be given a desired volume through two strategies; one strategy is the sheet networks strategy. According to sheet networks strategy, a certain thickness of the surface may be determined. This thickness may be defined as duplicating and offsetting the surface in two directions perpendicular to the surface which maintains the characteristics of TPMS on both sides of the created volume. At this stage, a unit cell of TPMS may be obtained where the determined thickness controls a solid volume fraction (or equivalently a relative density) of the TPMS-based structure within the unit cell. The relative density of TPMS-based structure may be defined as a solid volume of the TPMS-based structure divided by a volume of the smallest cube (e.g., unit cell) that encloses the TPMS-based structure or equivalently as a ratio of a mass density of the TPMS-based structure unit cell to a mass density of a solid part of the unit cell. The second strategy is the solid-networks strategy. According to the second strategy, a first one of two volumes separated by the minimal surfaces is solidified. In this strategy, the characteristics of minimal surfaces may be maintained at an interface between the solid part of the unit cell and void.

The CAD software may also allow calculating a volume and a surface area of the TPMS. A geometric, (specific) surface area may be defined as a total surface area of a TPMS-based structure di vided, by the corresponding volume of the TPMS-based structure. Changing a thickness and/or a size of a unit cell may control a geometric surface area of the TPMS. In a third step, a unit cell created may be patterned in three-dimensions within any desired structure or geometry. In some embodiments, the second step may be performed after the third step such that the TPMS surface may be patterned within the desired structure or geometry and then thickened or solidified to obtain a predetermined relative density or volume fraction. In a fourth step, a physical rendition of the TPMS-based structure and a stereolithography (STL) computer file may be generated for the three-dimensional (3D) component and then those may be sliced into two-dimensional patterns and may be repeated to form a 3D structure. In a fifth step, computer aided manufacturing may be employed to transform the computer aided designed file into a real object (e.g., product) made of any desirable material.

Example 1

Design Process for Catalytic Converter for Automotive Use

A catalytic converter including TPMS substrates (i.e., substrate including TPMS) may be used for a reduction and/or an oxidation of exhaust gases produced by, for example, internal combustion engines. Exhaust gases may pass through the catalytic converter thereby being purified. Some embodiments of the invention may include a change in a basic design of catalytic converter substrates. The change is from commercially available ceramic honeycomb-like cells that are uniformly extruded to make flow channels to a substrate based on triply periodic minimal surfaces. The change may enable increasing an efficiency of conversion processes. A method of manufacturing substrates based on triply periodic minimal surfaces by additive manufacturing will be described.

In the automotive industry, an internal combustion engine is a power-producing device and operates on a thermodynamic cycle. The fuel (e.g., gasoline or diesel) mixed with air may enter the engine and gets combusted thereby releasing its chemical energy in the form of heat, which is converted later into mechanical energy. As a result of the combustion process, exhaust gases are emitted via an exhaust system. These gases may contain toxic pollutants such as carbon monoxide (CO), nitrogen oxide (NOx) and hydrocarbons (HC). These harmful gases may cause environmental pollution if released to the atmosphere without purification. Hence, a catalytic converter may be used to reduce the pollutants of exhaust gases. Two types of catalytic converters may be used: first, a two-way oxidation catalytic converter which performs two simultaneous tasks of oxidation of CO to carbon dioxide ($CO_2$) and oxidation of HC to $CO_2$ and water ($H_2O$), and second, a three-way oxidation-reduction catalytic converter which performs three simultaneous tasks, reduction of NOx to nitrogen ($N_2$) and oxygen ($O_2$), oxidation CO to $CO_2$, and oxidation of unburnt HC to $CO_2$ and $H_2O$. The first type of converters may be widely used for diesel engines to reduce HC and CO emissions while the second type of converters may be most commonly used for gasoline-powered vehicles.

Figure 1:
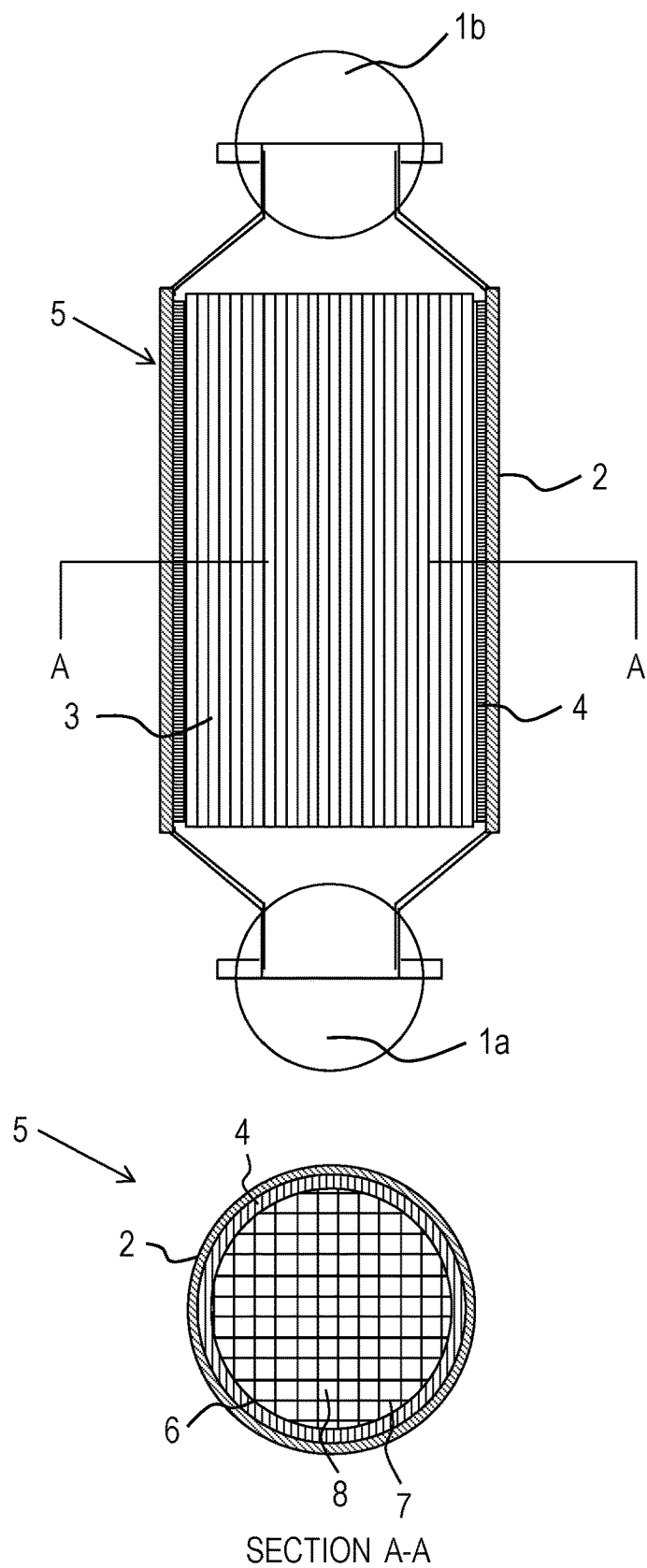

A catalytic converter 5, as shown in FIG. 1, may include several components. The catalytic converter 5 may include a substrate 3. A variety of internal geometries (architectures or structures) may be commercially available, and honeycomb structures with a square, triangular, or hexagonal structure cells 8 extending longitudinally to form flow channels, being separated by a partition wall 7 and being enclosed by a peripheral wall 6 may be used. In some embodiments, the substrate 3 may include a substrate structure including TPMS according to some embodiments of the invention. The substrate 3 may include a ceramic material and/or a metallic material The catalytic converter 5 may also include a washcoat. The washcoat may be used as a carrier for catalytic materials and may be used to disperse the catalytic materials over a large surface area to provide a higher catalytically active surface area that are available for reaction with the exhaust gases. The catalytic converter 5 may further include a catalyst, which itself may be a mixture of precious metals and rare earth metals impregnated into the washcoat. These components may be enclosed by a suitable casing 2 with an expanding mat 4 disposed between the substrate 3 and the casing 2. Gases may flow into the catalytic converter 5 through an inlet 1a and may exhaust through, the outlet 1b.

Recent environmental regulations on vehicle emissions impose a strong demand for improved catalytic converter designs especially for cold start state, where an exhaust gas conversion efficiency may be at its lowest. Cold start refers to a period of time that takes for a substrate of a catalytic converter to reach its desired temperature at which a conversion efficiency may be high enough (e.g., at its maximum). During the cold start, a substrate of a catalytic converter may not be warmed enough and may not be sufficiently activated. Therefore, an early activation of a catalyst during the cold start may be one of important objectives to comply with exhaust gas regulations. Manufacturers have been trying to reduce thicknesses of partition walls of a honeycomb substrate and to increase the activated surface area. By reducing the thicknesses of the honeycomb walls, the open frontal area may be increased and thus may increase the number of flow channels and the available surface area for chemical interaction. Further, the weight of a converter may be reduced, and the heat capacity of the catalytic converter may be decreased. The net effect may be a reduction of the time required to reach a predetermined operation temperature at which a catalytic conversion process takes place. However, reducing the cell wall's thickness may make the structure weaker and more susceptible to damage. Also, it may be beneficial to have only round corners without sharp corners in the substrate, since the washcoat may be accumulated on sharp corners, thereby interfering with the spreading of precious metals and lowering the possibility for interaction between precious metals and exhaust gases.

Figure 5:
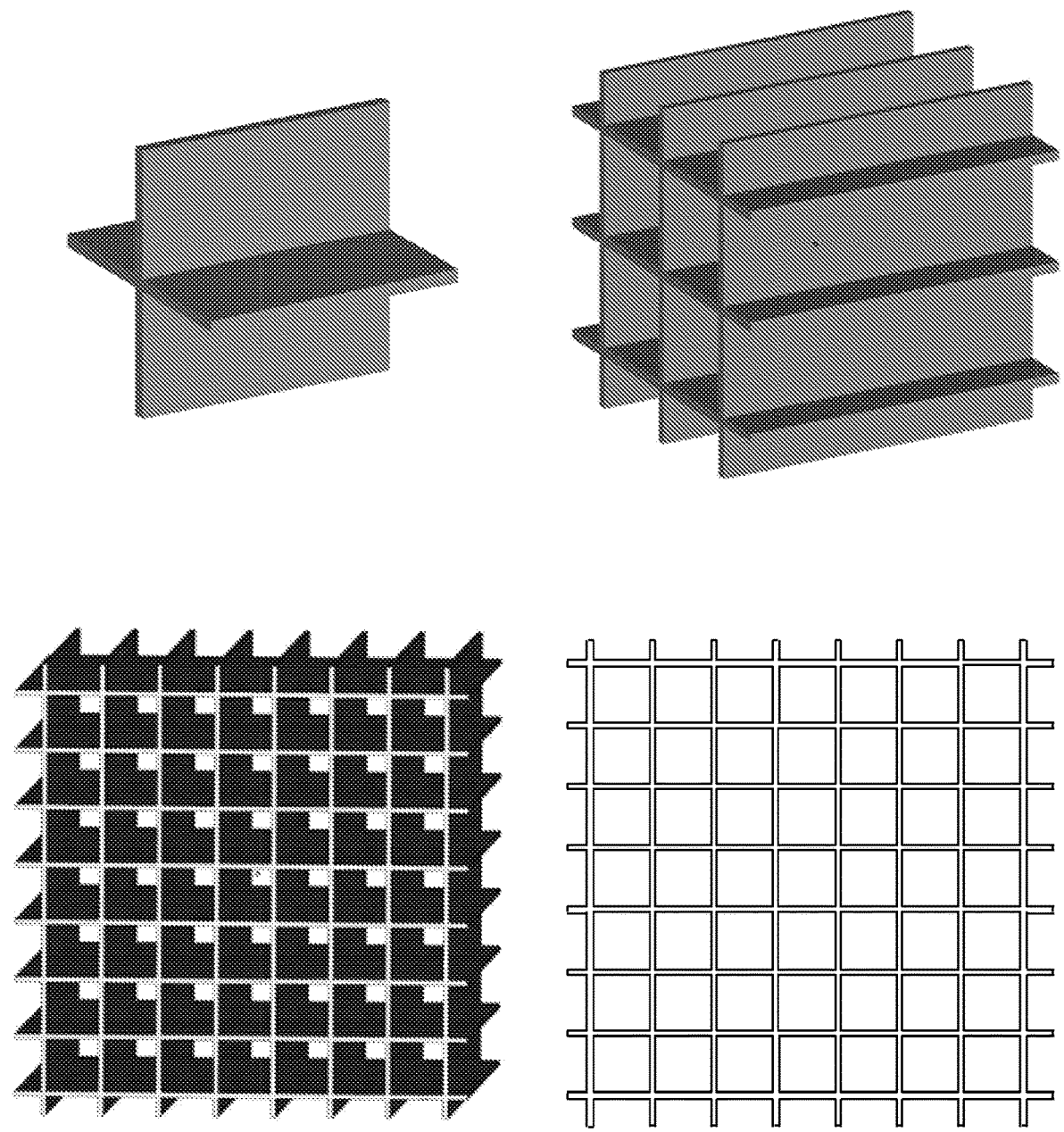
FIG. 5 shows a commercial catalytic converter substrate; a unit cell (top left); a 3×3×3 pattern of flow channels (top right); a 7×7 pattern of flow channels (bottom left); and a frontal view of the 7×7 pattern of flow channels (bottom right).

An example of a commercially available substrate design is shown in the top panels of FIG. 5. The substrate on the left top is a 3 by 3 unit cells rendition, and the substrate on the right top is a single unit cell. The drawbacks of these catalytic converter substrates may be overcome by adapting a design based on the TPMS. The minimal surfaces are topologies formed by enforcing local area minimization. These surfaces/topologies may divide space into two continuous interpenetrating non-intersecting volumes. Each minimal surface may possess zero mean, curvature (i.e., the sum of principal curvatures at any point on the surface is zero), minimal surface energy, minimal surface stress, and minimal surface tension.

TPMS structures are based on the concept of minimal surfaces. This structure takes a form of a unit cell repeated in the three dimensions thereby forming a periodic structure. This periodic structure may have advantages of being non-self-intersecting, being formed of continuous smooth curves with no sharp edges or corners, and splitting a space into maze-like spaces. Some examples of periodic minimal surfaces that can be used as base structure for catalytic converter substrates are shown in FIG. 2, FIG. 6, FIG. 7, FIG. 8 and FIG. 9, and any other TPMS structures may be used.

FIG. 2 shows examples of triply periodic minimal surfaces: A. Schwarz Primitive; B. Schoen's Gyroid; C. Schoen's I-WP; D. Schwarz diamond; E. Fischer-Koch PMY; F. FRD; G. Fischer-Koch CY; and PL Fischer-Koch S. FIG. 6 shows unit cells including TPMS and substrates of 3×3×3 patterns formed using the sheet networks, strategy: A. Schwarz crossed layers of parallels; R. Schoen's I-WP; C. Schwarz Primitive; and D. Schoen's Gyroid. FIG. 7 shows unit cells including TPMS and substrates of 3×3×3 patterns formed using the sheet networks strategy: A. Fischer-Koch S; B. Schwarz diamond; and C. Neovius. FIG. 8 shows unit cells including TPMS and substrates of 6×6×6 patterns formed using the solid networks strategy; A. Fischer-Koch S; B. Schwarz diamond; and C. Schoen's Gyroid, FIG. 9 shows unit cells including TPMS and substrates of 6×6×6 patterns formed using the solid networks strategy: A. Schoen's I-WP; and B. Schwarz Primitive.

As shown in FIGS. 6 through 9, a substrate structure for a converter according to some embodiments of the invention may include a plurality of unit cells arranged in three dimensions. Each of the plurality of unit cells may include a cavity defined by a triply periodic minimal surface, and the cavities of the plurality of unit cells may be interconnected to allow a fluid to pass through the cavities of the plurality of unit cells. Referring to FIGS. 6 and 7, each of the plurality of unit cells may include a sheet-shaped body, and both opposing surfaces of the sheet-shaped body may define triply periodic minimal surfaces that define cavities. The sheet-shaped body may have a uniform thickness. Referring to FIGS. 8 and 9, each of the plurality of unit cells may include a solid body, and only one surface of opposing surfaces of the solid body may define a triply periodic minimal surface that defines a cavity.

The fabrication of these complicated curved, continuous and smooth shapes may be possible with rapidly growing automated additive manufacturing techniques that may enable manufacturing complex geometries in a very fast and efficient way. These techniques may comprise using computer technology to design desired shapes and later manufacturing the designed shapes using computer controlled manufacturing.

As shown in FIG. 4, a first step of a method of manufacturing a catalytic converter TPMS-based substrate may use a computer-aided design (CAD) software to create mathematically based digital files for a three-dimensional triply periodic minimal surface. In a second step, the triply periodic minimal surfaces with no enfolded volumes may be employed to create a structure using the two strategies discussed above with reference to FIG. 3. The first strategy (sheet-networks) may be implemented by determining a thickness of the minimal surface, which is continuous and fixed throughout the surface, such that a new volume is created by offsetting the triply periodic minimal surface in two directions. Using the first strategy, a shell-like structure may be created and may separate two void volumes that may provide flow passages of exhaust gases.

The second strategy (solid-networks) may be implemented by solidifying one of volumes partitioned by the minimal surface. In some embodiments, a first one of the volumes partitioned by the minimal surface may be completely solid, and a second one of the volumes partitioned by the minimal surface may be completely void that provide a flow passage of exhaust harmful gases. At this stage, a unit cell of a TPMS-based structure may be obtained where the determined thickness or strut size controls a solid volume fraction (or equivalently a relative density) of the TPMS-based structure within the unit cell. A relative density of a TPMS-based structure may be defined as a solid volume of the TPMS-based structure divided by a volume of the smallest cube (or unit cell) that can enclose the TPMS-based structure or equivalently as a ratio of a mass density of the unit cell to a mass density of a solid part of the unit cell. The CAD software may also allow calculation of a volume and a surface area of the TPMS-based structure. The geometric (specific) surface area may be defined as a surface area of the TPMS-based structure of the smallest cube (or unit cell) that can enclose the TPMS-based structure divided by the corresponding volume. Changing a thickness and/or a size of the unit cell may control the geometric surface area of the TPMS-based structure.

In a third step, the unit cell created may be patterned in three dimensions within any desired structure or geometry. In some embodiments, the second step may be performed after the third steps such that the TPMS surface may be patterned within the desired structure or geometry and then the desired volume may be given to obtain a predetermined relative density or volume fraction. In a fourth step, a physical rendition of the TPMS-based structure and a stereolithography (STL) computer file may be generated for the three-dimensional (3D) component, and then those may be sliced into two-dimensional patterns and may be repeated, to form a 3D structure. In a fifth step, computer aided manufacturing may be employed to transform the computer aided, designed file into a real product made of any material.

Example 2

Selection Criteria for TPMS Catalytic Converter

As a first criteria, a TPMS structure and a unit cell size may be selected to increase or possibly to optimize a surface area. FIG. 12 shows a relative density as a function of a ratio of a wall thickness to a unit cell size of sheet networks based substrates. This graph may be applicable regardless of sizes of unit cells. Each of FIGS. 13-15 shows a geometric surface area as a function of a ratio of a wall thickness to a unit cell size of sheet networks based substrates. For different unit cell sizes, FIGS. 13-15 give a quantitative comparison of how the specific surface area may vary for the different TPMS architectures. Increasing a size of a unit cell may lead to decreasing a specific surface area. FIGS. 13-15 may be used as a guideline for geometrical design aspects of a catalytic converter substrate such as a relative density, a specific surface area, and a wall thickness for a certain unit cell size. For example, a unit cell comprising Fischer-Koch S surface has 2-3 times the geometric area of Schwarz crossed layers of parallels (CLP) structure. A large specific surface area of a substrate, on which the catalytically active washcoat is deposited, may be one of essential considerations for selecting TPMS-based structures that may reduce an amount of a catalyst thereby increasing a conversion efficiency of the converter.

As a comparative example, a commercially available catalytic converter substrate having a honeycomb structure and square unit cells (See FIG. 5) was used. The unit cell may be given a length of 1.27 mm and a wall thickness of 0.109 mm. The CAD software calculates a surface area to be 5.898 mm$^2$ and a volume of the unit cell to be 2.048 mm$^3$; accordingly, the geometric surface area is 2,875 m$^2$/m$^3$, and a relative density (here equal to the solid volume fraction) of 16.4%.

As an example, a novel catalytic converter substrate based on the Schwarz crossed layers of parallels (CLP) (see FIG. 16) was used. A unit cell is given a length of 1.27 mm and a wall thickness of 0.109 mm, which is the same as those given above, The CAD software calculates the surface area to be 5.695 mm$^2$ and the volume of the unit cell to be 2.048 mm$^3$; accordingly, the geometric surface area is 2,780 m$^2$/m$^3$ with a relative density of 15.2%. This reduction in the relative density as compared to the commercially available substrate (16.4% relative density) may be translated to 7.3% reduction in a weight without compromising much the available surface area (3% reduction). In addition, the CLP substrate geometric features may allow many desirable attributes, which may not be provided by the commercially available substrate, including, for example: 1) better distribution of a washcoat; 2) enhanced turbulence; 3) providing interchangeable flow passages; 4) no sharp corners to trap a large quantities of a washcoat; and 5) higher interaction between gases and catalysts.

In a second example, a catalytic converter substrate is based on the Primitive (P) cell (See FIG. 17). The unit cell is given a cell size of 1.27 mm and a wall thickness of 0.109 mm. The CAD software calculates a surface area to be 7.448 mm$^2$ and a volume of the unit cell to be 2.0484 mm$^3$, accordingly; a geometric surface area is 3,636 m$^2$/m$^3$ and a relative density of 20%.

Example 3

3D Production of TPMS Catalytic Converter Substrate

TPMS-based catalyst substrates may include a metallic material and/or a ceramic material. Catalyst materials which may cover a surface of the TPMS-based substrate may include one or more (i.e., a mixture) of the following materials: metals such as platinum, palladium, rhodium, iridium, ruthenium, yttrium, zirconium, tantalum, cerium, osmium, nickel, copper, and the like, and oxides, mixtures, and alloys comprising at least one of the forgoing, and other conventional catalysts. Catalyst materials may be wash coated, impregnated, imbibed, precipitated, chemi-sorbed, physi-sorbed, or otherwise may be applied to catalyst substrates. A corrosive-resistant and a thermal-durable material may also be disposed on portions of or all of TPMS-based catalyst substrates using any or a combination of the-methods listed above.

A TPMS-based catalytic converter substrate may be made of maraging steel using a selective laser sintering technique and the Primitive TPMS. The scanning electron microscopy (SEM) image of FIG. 18 shows the controlled thickness of the 3D printing and surface roughness which may be beneficial for enhancing turbulence and attaching a washcoat containing the precious material to a substrate.

The above-disclosed subject matter is to be considered illustrative, and not restrictive, and the appended claims are intended to cover all such modifications, enhancements, and other embodiments, which fall within the true spirit and scope of the invention. Thus, to the maximum extent allowed by law, the scope is to be determined by the broadest permissible interpretation of the following claims and their equivalents, and shall not be restricted or limited by the foregoing detailed description.

That which is claimed is:

1. A catalytic converter comprising:
    a casing forming an inlet and an outlet, wherein the casing forms an enclosed volume via which the inlet and the outlet are in fluid communication; and
    a catalytic element disposed within the enclosed volume, wherein the catalytic element comprises one or more catalyst materials and unit cells arranged in three dimensions, wherein the catalytic element has cavities that are interconnected to accommodate a flow of exhaust gas received by the inlet to pass through the cavities of the unit cells to the outlet, and wherein the casing encloses the flow of exhaust gas from the inlet to the outlet, and wherein catalytic element comprises triply periodic minimal surfaces that define a plurality of the cavities.

2. The catalytic converter of claim 1, wherein the unit cells comprise sheet-shaped bodies having opposing triply periodic minimal surfaces.

3. The catalytic converter of claim 2, wherein each of the sheet-shaped bodies has a uniform thickness.

4. The catalytic converter of claim 1, wherein the unit cells comprise solid bodies, and wherein each of the solid bodies has a triply periodic minimal surface.

5. The catalytic converter of claim 1, wherein the triply periodic minimal surfaces comprise one or more of a Schwarz Primitive surface, a Schwarz crossed layers of parallels (CLP) surface, a Schoen's Gyroid surface, a Schoen's I-WP surface, a Schwarz diamond surface, a Fischer-Koch PMY surface, a FRD surface, a Fischer-Koch CY surface, a Fischer-Koch S surface, or a Neovius surface.

6. The catalytic converter of claim 1, wherein the catalytic element comprises a metallic material and/or a ceramic material.

7. The catalytic converter of claim 1, wherein one or more of the catalyst material is disposed on the triply periodic minimal surfaces.

8. The catalytic converter of claim 7, wherein the catalytic element comprises a washcoat, and one or more of the catalyst materials is dispersed in the washcoat or impregnated into the washcoat.

9. The catalytic converter of claim 8, wherein the washcoat has a rough and/or irregular surface.

10. The catalytic converter of claim 7, wherein the one or more catalyst materials comprises one or more of platinum, palladium, rhodium, iridium, ruthenium, yttrium, zirconium, tantalum, cerium, osmium, nickel, and/or copper, and an oxide, a mixture, or an alloy thereof.

* * * * *